(12) United States Patent
Wilmsen et al.

(10) Patent No.: US 11,216,870 B2
(45) Date of Patent: Jan. 4, 2022

(54) METHOD AND APPARATUS FOR ASSIGNING AGENTS USING UPDATED CRITERIA TABLES

(71) Applicant: Consolidated Asset Recovery Systems, Inc., Raleigh, NC (US)

(72) Inventors: James Michael Wilmsen, Castle Pines, CO (US); Nathan Eric Wykes, Broomfield, CO (US); Terry Lee Groves, Cape Coral, FL (US); Ronald Steven Norwood, Raleigh, NC (US)

(73) Assignee: PRIMERITUS FINANCIAL SERVICES, INC., Nashville, TN (US)

( * ) Notice: Subject to any disclaimer, the term of this patent is extended or adjusted under 35 U.S.C. 154(b) by 193 days.

(21) Appl. No.: 16/539,110

(22) Filed: Aug. 13, 2019

(65) Prior Publication Data

US 2019/0362420 A1    Nov. 28, 2019

Related U.S. Application Data

(63) Continuation of application No. 15/426,323, filed on Feb. 7, 2017, now abandoned.

(51) Int. Cl.
*G06Q 10/06* (2012.01)
*G06Q 40/02* (2012.01)
*G06Q 20/24* (2012.01)
*G06Q 30/08* (2012.01)

(52) U.S. Cl.
CPC ..... *G06Q 40/02* (2013.01); *G06Q 10/063112* (2013.01); *G06Q 10/063114* (2013.01); *G06Q 20/24* (2013.01); *G06Q 30/08* (2013.01); *G06Q 40/025* (2013.01)

(58) Field of Classification Search
CPC .......... G06Q 40/02; G06Q 10/063112; G06Q 10/063114; G06Q 20/24; G06Q 40/025; G06Q 30/08; G06Q 10/0633; G06N 20/00; G05B 2219/15077; G06F 7/026
See application file for complete search history.

(56) References Cited

U.S. PATENT DOCUMENTS

| | | | |
|---|---|---|---|
| 8,612,262 B1* | 12/2013 | Condon | G06Q 40/08 705/4 |
| 2003/0154119 A1* | 8/2003 | Stoliker | G06Q 10/10 705/7.15 |
| 2005/0222947 A1* | 10/2005 | Regan | G06Q 20/10 705/39 |
| 2005/0235008 A1* | 10/2005 | Camping | G06Q 10/087 |

(Continued)

*Primary Examiner* — Mehmet Yesildag
*Assistant Examiner* — Ayanna Minor
(74) *Attorney, Agent, or Firm* — Loza & Loza, LLP; Gordon R. Lindeen, III

(57) ABSTRACT

A method and apparatus are described for assigning agents using updated criteria tables. In one example, an assignment system maintains an assets table including properties of assets, a recovery agent criteria table including values for a location and a capacity of recovery agents, and a requester criteria preferences table including agent preference factors received from requesters. A requester requests a recovery agent to recover an asset. The agents are scored and weighted using the tables and the asset is assigned to a selected agent. The agent capacity criteria is adjusted in response to the assignment and the agent capacity criteria is adjusted in response to receiving recovery status information about the asset.

20 Claims, 7 Drawing Sheets

(56) References Cited

U.S. PATENT DOCUMENTS

| | | | |
|---|---|---|---|
| 2009/0099897 A1* | 4/2009 | Ehrman | G06Q 10/06 705/7.15 |
| 2011/0137730 A1* | 6/2011 | McCarney | G06Q 30/0203 705/14.58 |
| 2014/0222453 A1* | 8/2014 | Wills | G06Q 30/02 705/2 |

* cited by examiner

METHOD AND APPARATUS FOR ASSIGNING AGENTS USING UPDATED CRITERIA TABLES

CROSS-REFERENCE TO RELATED APPLICATIONS

This application is a continuation of U.S. patent application Ser. No. 15/426,323, filed Feb. 7, 2017, entitled "SELECTION CRITERIA UPDATES IN AN ASSET RECOVERY WORKFLOW," the priority of which is hereby claimed.

FIELD

The present description relates to the field of maintaining selection criteria tables and, in particular, to updating the criteria tables upon making assignments and upon receiving status information about the assignments.

BACKGROUND

Loans and leases are a key part of making new and used automobiles affordable and immediately available to people from all walks of life. These financing models are also applied to many other types of physical assets from recreational vehicles and boats to furniture and jewelry. In many of these loans and leases, the capital provided by the lender or lessor to buy the asset is secured by the actual physical asset. In the event that the purchaser is no longer willing or able to make the outstanding payments on the loan or the lease, then the lender or lessee is able to exercise this security interest and take possession of the physical asset that secured the loan or the lease. The lender or lessor will then typically sell the asset to recover at least a portion of the lost capital. While the lender or lessor can simply ask the debtor to return the physical asset, in many cases the lender or lessor will hire a repossession agent to help with the return.

In the automotive recovery industry, many lenders have a staff assigned to manage the process of recovering on bad debt when buyers stop paying. This staff notifies the buyer when payments have been missed, selects repossession agents to locate and take back automobiles, and selects venues to resell the automobiles to other buyers or to resellers. The recovery industry includes repossession agents to actually find and repossess the automobiles, forwarders who aggregate groups of repossession agents and forward cases to the agents, remarketing agents to market repossessed automobiles to different buyers, auction houses to sell the automobiles, and other players.

Different types of lenders use different types of agents for different parts of the process. For dealer financing, a repossessed automobile may be resold by the same dealer. For manufacturer financing, a repossessed automobile may be placed back into the manufacturer's dealer network for sale. For bank financing, a repossessed automobile may be sold at a dealer or a consumer auction that is operated by the bank or by a separate auction house. In some cases, the recovered automobile may be in such a condition that it is handed over to a remarketer for sale, sold by another type of dealer, or sold for parts. While some lenders may have an established network of agents for typical cases, when a repossessed automobile is not typical due to its type or condition or because it has been recovered in a faraway place, then the established network may no longer be sufficient. A lender's regular asset recovery and marketing agents may no longer be the best choice.

SUMMARY

A method and apparatus are described for assigning agents using updated criteria tables. In one example, an assignment system maintains an assets table including properties of assets, a recovery agent criteria table including values for a location and a capacity of recovery agents, and a requester criteria preferences table including agent preference factors received from requesters. A requester requests a recovery agent to recover an asset. The agents are scored and weighted using the tables and the asset is assigned to a selected agent. The agent capacity criteria is adjusted in response to the assignment and the agent capacity criteria is adjusted in response to receiving recovery status information about the asset.

DETAILED DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

By using intelligent automatic selection of repossession or recovery agents, remarketing agents, and auctions the described system is much more efficient, reliable, and effective at returning assets and proceeds against deficient loans. Techniques are described herein that use criteria about the physical asset, the asset's location, and the timing of the recovery and sale. Criteria about the various agents in the process are also used to select agents throughout the process. Some of the agent criteria include real time performance, pricing, efficiency and load. Other criteria may be used as appropriate for different assets and different types of agents.

In addition to information about assets and agents, customer preferences may also be used to fine tune selections and process parameters. Additional workflows may also be applied such as reassigning a vehicle after ten days to a new agent or to a forwarder. As new data becomes available such as the actual location of an asset, this may be applied to find an agent closer to the vehicle.

Instead of manually selecting the best agents, forwarders and remarketers, lenders and agent managers can receive automatic selections based on better information. Finding the right agents to maximize the return on bad loans is difficult and prone to errors. The difficulties persist through the entire recovery and remarketing workflow. Each person making these decisions is likely at times to apply uncertain or erroneous subjective factors. The decisions are often made in isolation and do not incorporate the entire workflow from finding the asset to liquidation. The described system takes into account the latest data and agent performance. It also accommodates subtleties that a human may not understand or perceive as part of the selection process. While the present description is primarily in the context of automobiles, it applies in the same way to other mobile and portable assets that are subject to repossession. This includes other types of vehicles as well as other movable and portable physical property, such as jewelry, furniture, and other valuables.

Figure 1:
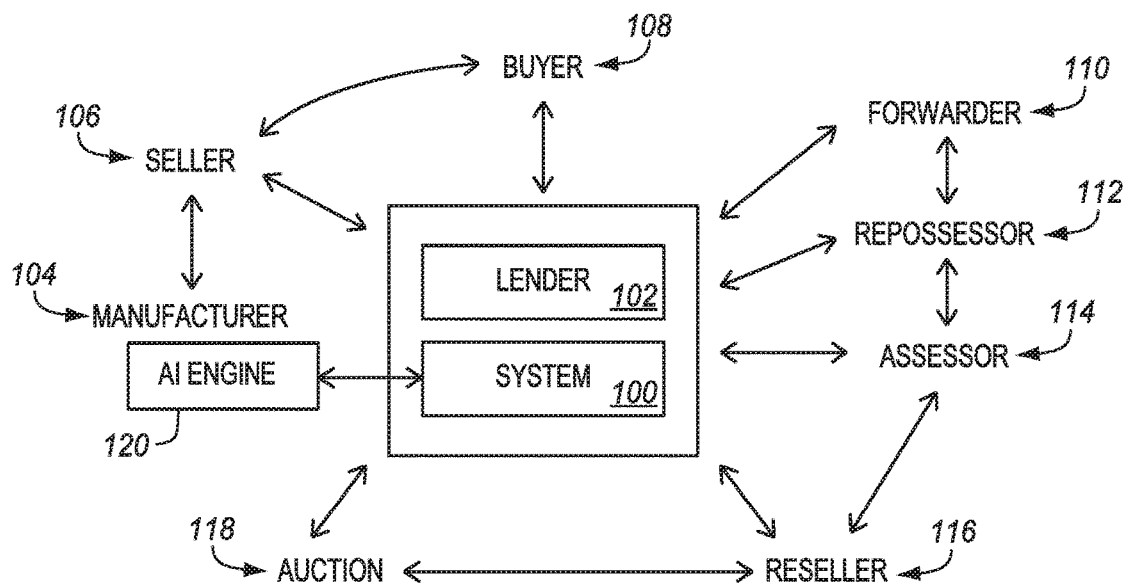
FIG. 1 is a diagram of interactions between parties to a recovery workflow as applied to the described embodiments.

FIG. 1 is a diagram of interactions between parties to a recovery workflow as applied to the described embodiments. A lender or lessor 102 is at the center of the transactions and interacts with all of the parties. The interactions begin with a manufacturer 104 that produces or finishes the asset. The asset is provided, perhaps through intermediaries to a seller or dealer 106 that sells the asset to a buyer 108. The lender may be sponsored or approved by the manufacturer or may be a division or related company with the manufacturer or instead with the seller. The buyer establishes a loan or lease relationship with the lender.

Upon default, a forwarder 110 upon request of the lender 102 contacts a repossessor 112 which recovers the asset. The asset is then assessed 114 and given over to a reseller 116 or to a seller 106. The assessment of the vehicle often takes place in two steps. Any or all of the assessments may be processed by the system. There is often an initial assessment from the repossessor 112 who provides a condition report with pictures. There is also a more detailed assessment when the car an auction. This is then used to set a final floor price of the asset. There are also separate third party assessment firms 114 as well that may be used to determine a floor price or an appropriate reseller. The reseller may provide the asset to an auction 118 or sell it directly. All of these different parties have interactions with the lender and the lender tracks the progress of the asset through all of these parties. In some cases, there may be fewer parties but in other cases there may be more parties.

The transactions are all improved and automated with the use of a server system or other type of computing system 100 in the center of the interactions. In some cases, the server system performs operations on behalf of or instead of the lender. The server system allows any one or more of the parties to the transaction interact remotely with it. In other cases, the system acts on behalf of another party to the interactions as explained in more detail below. In addition, the operation of the system 100 may be enhanced with an integrated or external AI Engine 120. The AI engine evaluates criteria and results to improve the selection process based on past experience developed over time with similar lenders, assets, locations, and other factors.

Figure 2:
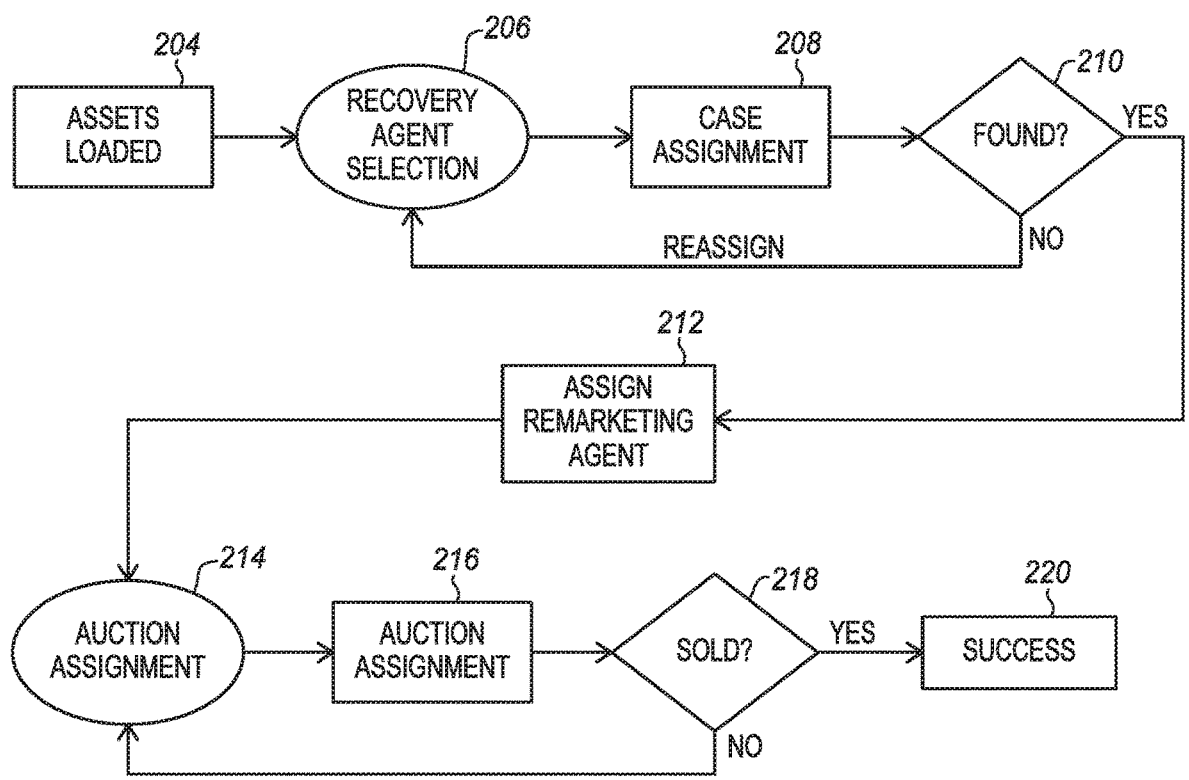
FIG. 2 is a diagram of an asset recovery workflow according to embodiments.

FIG. 2 is a diagram of an asset recovery workflow. For purposes of this example among others, the description is given from the perspective of a lender that loans money to a debtor with which the debtor purchases an automobile. The lender secures the loan with the automobile. The same examples, systems, and techniques also apply to a lessor that leases an automobile to a lessee in exchange for a periodic payment but in which the lessor owns the automobile. The same examples, systems, and techniques may also be applied to other types of transactions with automobiles and other physical assets. The lender is described as independent of the other parties but may instead be a part of or acting with another party. The physical asset is described as an automobile but may be any other physical asset that can be repossessed and resold.

The process flow begins with a default in a loan, lease, or other type of transaction. This is typically a missed payment or two. However, there may also be other types of failures by the debtor or buyer, such as a failure in insurance, in a license, or damage to the automobile. Upon default, or even before any default, a description of the asset is loaded into the system at 204. The description may include an identification of the automobile, such as year, make, model, and identification number, the current or last known location of the automobile, the type of loan or placement, the number of agents that have already tried to find the automobile, information about the lender and the debtor, and any other suitable or helpful criteria. The asset description may include the type of payment, or loan, such as low yield, subprime, fleet, corporate, lease, etc.

This information is typically provided by the lender, although there may be a recovery service that acts on behalf of the lender. This list of descriptive information is provided as an example, more or fewer items and types of information may be used. An estimate of the value of the asset can also be determined by the lender and provided to the system. The operation and structures described herein are suitable for many different types of lenders including captive lenders, such as those owned by a manufacturer, prime lenders, subprime lenders, and title lenders. Some lenders may span more than one category. Using the described system selections and assignments may be tailored to suit any one or more of these types of lenders.

In addition to a description of the loan and the automobile, the lender may also enter certain preferences, such as preferred recovery agents, preferences for certain characteristics of loan agents and other types of preferences.

With a description of the asset and the loan loaded, the system is able to select a recovery agent at 206. The recovery agent may be a forwarder that forwards the case but does not repossess the automobile directly or the recovery agent may be a person or group that will directly repossess the automobile. At 208 the case is assigned to the selected recovery agent by sending an order or request to that agent. Using an automated system, the assignment may be done directly by a computing or server system using current information about the selected agent and using asset information that was just loaded.

Upon receiving the assignment, the selected agent will attempt to recover the automobile. This may involve simply going to the received asset location and retrieving the automobile from the debtor. In some cases, there may be additional effort to find the automobile and to obtain possession. In some cases, the recovery agent may not be able to recover the automobile because it cannot be found or because it has been moved to a faraway location. The system will monitor the progress of the recovery agent and determine whether the asset has been recovered at 210.

If the agent has not succeeded in recovering the asset at 210, then the automobile may be reassigned. At 206 a new recovery agent is selected. The case is withdrawn from the unsuccessful agent and forwarded at 208 to a different agent. The new agent may then also be monitored. The reassignment may occur because the original agent is too busy, does not have the needed tools or for any other reason. In some cases, the automobile has been moved and is now far from the agent. Another agent closer to the automobile will be able to recover the automobile more easily.

If the agent has succeeded in recovering the asset at 210, then the asset is passed to a remarketing agent at 212. As examples, the automobile may be remarketed by auction at 214 or by direct sale to a dealer. There may be other remarketing possibilities as well that are not shown here for simplicity.

After an appropriate auction house is selected at 214, the auction assignment is forwarded to the selected auction house at 216 with the appropriate information describing the automobile. The assignment may also be forwarded to the recovery agent so that the recovery agent can transfer the automobile to the auction house. After assigning the automobile, if it is sold, then at 220 the sale is reported to the system. System records are updated and the funds are transferred from the auction house to the lender. On the other hand, if the automobile is not sold at 218, then it may be reassigned to a different auction house at 214. This workflow is provided as a general overview and context for the description below. There may be many other operations and other agents involved, depending on the particular asset and the lender.

Figure 3:
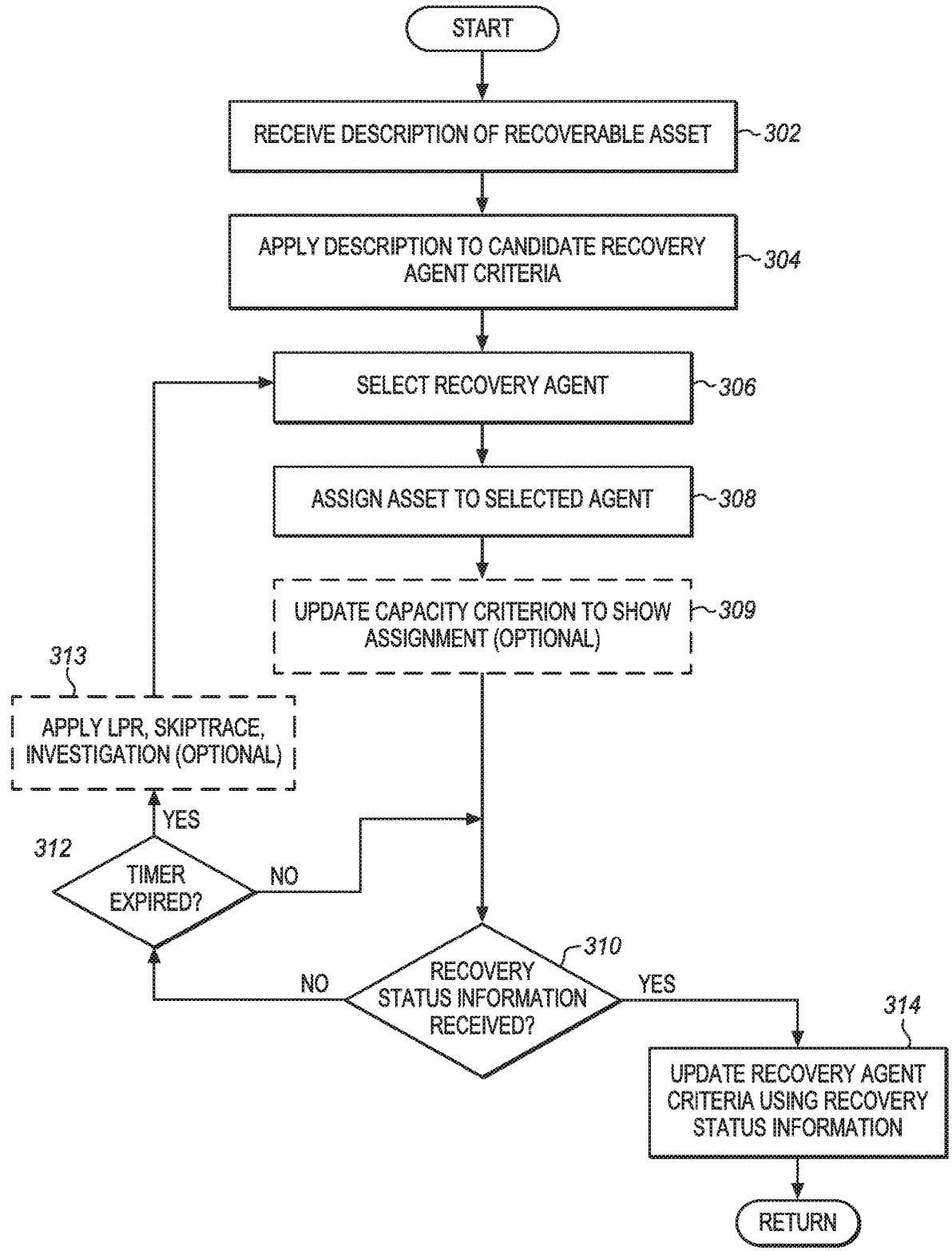
FIG. 3 is process flow diagram of a selection of a recovery agent according to embodiments.

FIG. 3 is process flow diagram of a selection of a recovery agent that is executed by the system 100 of FIG. 1. The process is started when a loan or lease is initiated or after an event that causes repossession, such as a default. A description of the asset and the loan or lease is entered by an operator such as a lender's default staff into the system. As shown, after START at 302 the system receives the description of the recoverable asset. The description may include many different properties. Typically, the description will include a property to identify the asset, such as a vehicle identification number or similar information, such as make, model, color, age, etc. The description will also include some indication of the location of the asset, such as the address of the buyer or lessee or the last known location of the asset.

There are other properties that may also be useful to the system and included in the description, such as the condition of the asset, any unique characteristics of the asset, information about how to repossess the asset, and different locations of the asset at different times of day. There may also be information about the loan or lease, such as the amount of time since the default, the type of loan (retail, fleet, subprime, etc.), the size of the payments, the amount that has been paid into the loan, the agent that provided the loan, etc. There may also be information about the lender that is seeking repossession and about the buyer that is in default, including name and contact information. Some of this information is important to conduct business transactions and some or all of this information may be used to select a recovery agent. More or fewer properties may be included in the description of the asset, depending on the nature of the asset and the desired recovery agent.

The description is entered in to a table, database or other record system for asset records. Each asset record may include the description and a current status. At this stage in the process, the status is in default and pending recovery. The system may track the history of the status and use status changes as information about the records. The description may have several different types of properties. One type is fixed characteristics, such as make and model. Another type is updateable as it may change over time, such as condition, wholesale value, and location. A third type is status, such as pending recovery, assigned to particular agent, etc.

At 304 the system applies the description of the asset to criteria that describe some number of candidate recovery agents. The system has records for recovery agents. The recovery agents may be forwarders or direct repossession agents or both. Both types of agents, among others, may be compared to each other by the system. The system maintains values for each agent for different criteria. A table of agent criteria values or any other type of data store may be used to maintain this data. Some agents may not have a value for some of the criteria in which case a neutral value may be used as a default. Some helpful criteria include a location or territory in which the agent is active, the recovery rate (the portion of assignments that are successful), the number of days from assignment to recovery, a quality rating by lenders and by borrowers, regulatory compliance, certifications and licenses, pricing, capacity (number of current assignments compared to ability to perform assignments), etc.

These properties of the asset are then compared to these criteria to select a recovery agent at 306. There may be some properties that are applied first as a constraint to limit the number of possible or candidate agents. As an example, geography can be used to first limit all candidate agents to those within 100 km of the location of the asset. A white list or a black list may then be used to limit those nearby agents to only include those on the white list or to exclude those on a black list. Capacity may be used to exclude those agents that are already too busy to take on new assignments. The asset properties may then be applied to a smaller list of candidate agents providing a faster and better selection. A variety of different factors and weights may be applied to the selection as described in more detail below.

Accordingly, criteria may be used in two ways, as a constraint to limit the number of candidates or as a value for use in generating a score or a ranking. Location, for example, may be used in both ways, first to limit the candidates to those nearby and then as part of the score to rank the closest agents more highly. Make may be used as a constraint to exclude those agents that do not service a particular make. Time to recovery may be used as a value to score the faster agents more highly. In some embodiments, the system applies the constraints first to limit the total number of candidates and then applies the values to generate scores. The system may receive instructions from the operator and then select the constraints based on these instructions. In other embodiments, the system scores all agents and those that, for example, are far away from the asset, score very low.

Alternatively, the system may generate a list of recommended recovery agents and provide the list to an operator. The list may be ranked based on how each recovery agent scores for the particular asset. The operator, acting on behalf of the lender, may then select one of the recovery agents from the list. In some embodiments, the system may produce a confidence score for each recovery agent and provide that score with the list. The confidence score indicates the certainty of the ranking. In some embodiments, the system may use the confidence score to determine whether to present the list to the operator. If the confidence score is high enough, then the assignment will be forwarded to the recovery agent automatically without any operator input.

After an agent is selected at 306, then at 308 the system assigns the repossession task for that asset to the selected agent. The system can do this directly or the lender or other operator may be alerted to do it. After the asset has been assigned, the system may perform additional operations, such as receiving an acknowledgement from the agent, alerting the lender, alerting the buyer and corresponding with any other interested parties.

In some embodiments, the system may alter the value of the capacity criterion for the selected agent at 309. After the newly added asset has been assigned to an agent, that agent is able to process one less repossession than before. The system can track this as the agent is assigned assets and as the agent recovers assets to maintain a current capacity value. In other embodiments, the capacity is based on periodic reports from the agent or others.

At 310 the system looks to determine if recovery status information has been received. This may be a process maintained by checking incoming status information or by retrieving external status information. The recovery status information may include whether or not the asset has been recovered, the time, the current location of the asset, and in some embodiments, an update to the description of the asset to include any changes to the asset, such as damage or wear and any previously unknown information such as accumulated miles drive.

If the asset has not been recovered then a timer may be used at 312 to recheck the status after an interval. In some embodiment, the timer may be used to determine whether to request a status from the agent or to reassign the asset to a different agent, since the current agent is taking too long. If the current agent is too slow then the process may return to 306 to select a new agent. In some embodiments, the process may go to 313 for other services to find the asset or the purchaser. This information may then be provided to the same agent or a new agent, depending on the circumstances. As examples license plate recognition services may be used to see if a car's license plate has been seen in public areas. Skiptrace may be hired to find the buyer. An investigator may be hired to find the buyer or the asset. Any information from other services may help the agent to find the asset. This information may be provided to the selected agent or to a new agent by the system in order to speed the recovery.

In the automobile industry, an automobile is worth more if it is newer. In addition, the lender has losses for each day that any capital is extended to a debtor in default instead of being invested in something that provides a return. Finally, the longer an automobile is possessed by a debtor in default, the more likely it is that the automobile will be moved or damaged. These and other factors all provide urgency to the recovery and remarketing process. As a result, the timer may be used and recovery agents may be ranked at least in part on how quickly automobiles are recovered.

If the asset has been recovered, then at 314 recovery status information is used to update any of a variety of different recovery agent criteria. This will depend on the criteria that are maintained by the system. The capacity of the agent may be increased by one, the time to recovery may be updated using the time for this recovery. Reactions from the buyer may be used to update quality criteria. Recovery rate, pricing and other criteria may also be updated. The process then returns to the start for the next asset.

After the agent has succeeded in recovering the asset, then the asset information originally loaded at 302 may also be updated. The received updates may include current mileage, any changes in condition, the current location of the automobile, and any other updates to the description of the automobile. This updated description is also stored in the asset status table and is available to be applied to determining how to best recover the value of the automobile as show in FIG. 4. As examples, the automobile may be remarketed by auction or by direct sale to a dealer or sold for salvage. There may be other remarketing possibilities as well that are not shown here for simplicity.

Figure 4:
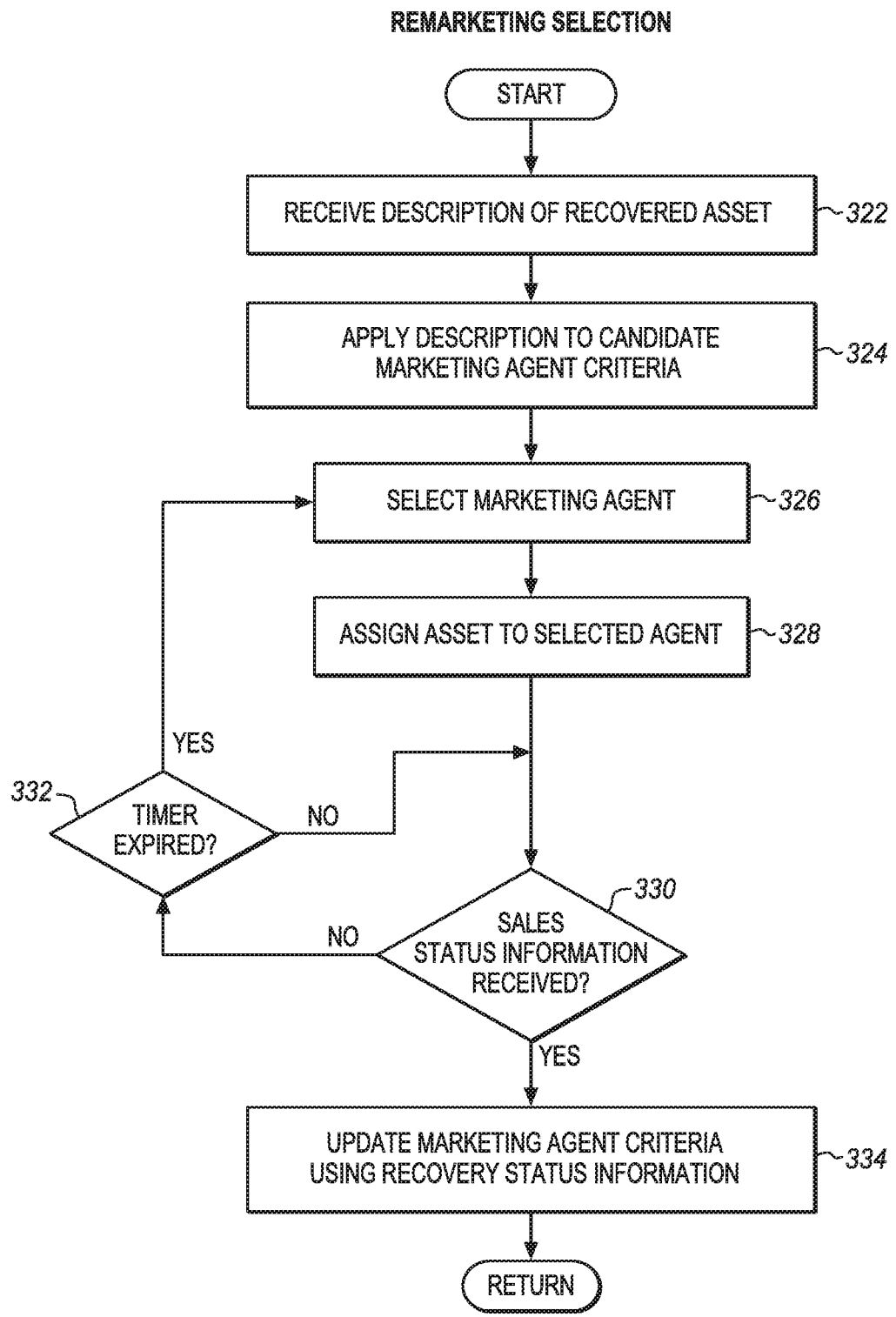
FIG. 4 is process flow diagram of a selection of a remarketing agent according to embodiments.

FIG. 4 is a process flow diagram of how the system can select a remarketing agent. The remarketing agent is an agent to sell the asset after it is recovered. The remarketing agent may be a particular auction house, a particular auction, or a separate agent that uses auctions and other techniques to sell the asset. In some cases, the system may select the best remarketing agent. Once a remarketing agent is selected, the system may select the best auction for the remarketing agent to use. In another example, the system may first choose the auction and then the remarketing agent based on the selected auction. In any event, the selection is similar and relies in part on the nature of the asset, the location where the best price can be obtained, and the distance of the asset from that location. As an example, a four wheel drive truck may have more value in the North, while a rear wheel drive truck may have more value in the South. As a further example, a convertible may sell faster in New England in the summer but in the South in the winter.

The system can utilize data from all aspects of the entire workflow, as shown for example in FIG. 2, to create the best outcome. The remarketing and auction selection can influence the selection of the original recovery agent. The best recovery agent in the vicinity of the best auction may be the best selection for some assets. The decision about how to remarket the recovered asset may be made by default based on the lender or type of car or based on a variety of different criteria in a manner similar to the recovery agent selection.

To select an auction house, the updated asset information, such as a description of the vehicle and its location are applied to a set of criteria for different candidate auction houses. Typically the system selects an auction house that is near the automobile and that obtains good prices for the particular type of automobile. However, by using multiple criteria and by weighting the criteria, a more intelligent result may be obtained.

Turning to the process flow diagram, the selection of a remarketing agent begins at the start with receiving a description of a recovered asset at 322. This may be the same description as at the start of FIG. 3 or an updated description with any new or changed information about the asset that can be found after the asset is recovered. As mentioned above, the asset may have accumulated additional miles, moved to a different location, or have been damaged or modified in some way. In addition, the original information may be inaccurate so that with possession of the actual asset, the description can be confirmed or corrected. This information will typically be provided by the forwarding or recovery agent. If possession of the asset has been turned over to someone else, then the receiver of the asset may enter the additional, updated, or corrected information. An assessor may also be used to provide additional information regarding condition and estimated sales price.

At 324 the description is applied to criteria for candidate marketing agents. Some of these criteria are the same types of criteria but with different values due to the differences between recovery and remarketing. These criteria may include location and value of the asset, legal compliance, capacity, ratings, etc. Other criteria may be different, such as sales performance in the location, seasonal effects at the location, transportation costs to reach the remarketing agent, etc. Some of the criteria may be applied as constraints. Some of the criteria may be applied as scoring values. Some of the criteria may be applied in either way based on operator preferences.

The description is applied to the criteria so that at 326 the system selects a marketing agent. At 328, the asset is assigned to the selected agent. The agent is then notified and the asset is transferred to the remarketing agent. The system may also notify the lender of the updated status by which the asset has been transferred to the marketing agent. The capacity data for the remarketing agent may also be updated to reflect the additional assignment.

Having received the assignment, the remarketing agent seeks to sell or transfer the asset to obtain a return for the lender. The remarketing agent may select an auction or the system may assign an auction for the remarketing agent to use. The remarketing agent may alternatively sell the asset to a dealer or end customer directly. The remarketing agent may offer the asset at several different auctions or to several different customers before obtaining a sale.

At 330 the system looks to determine whether sales status information has been received and, for a sale, whether the floor price has been met. This may be driven by a timer, by a user request or any other way. If no status information has been received, this may be because the remarketing agent has failed to report or because the remarketing agent has failed to sell the asset. A timer may be used at 332 so that the asset is reassigned after some amount of time. If the timer has expired, then the system returns to 326 to select another remarketing agent. A status inquiry may also be sent to the current remarketing agent first to determine whether the asset has been sold. The current agent may have multiple runs at one or more auctions trying to sell the vehicle before a timer would expire causing a new remarketing agent to be selected. The timer may be set to the time of the next auction by the auction house or to some other value.

If the automobile is instead to be remarketed in some other way after the timer expires, then a different type of reseller may be selected and the automobile is transferred to the newly selected reseller. In some cases, the asset may be sold to the reseller, the sale is reported and the funds are transferred from the reseller to the lender. The reseller may be an agent that acts on behalf of particular purchasers, a dealer, a parts salvage operation, or a variety of other resellers.

If recovery status information has been received, then at 334 the criteria values for the marketing agent criteria can be updated using the new recovery status information. This kind of information may include capacity, time to sell, pricing, etc. In addition, the asset description may be updated to indicate when, where, and how the asset was sold and for what price. The lender may also be notified of the updated status so that the lender can expect to recoup the value of the asset. With the asset sold, the system returns to process another asset.

Figure 5:
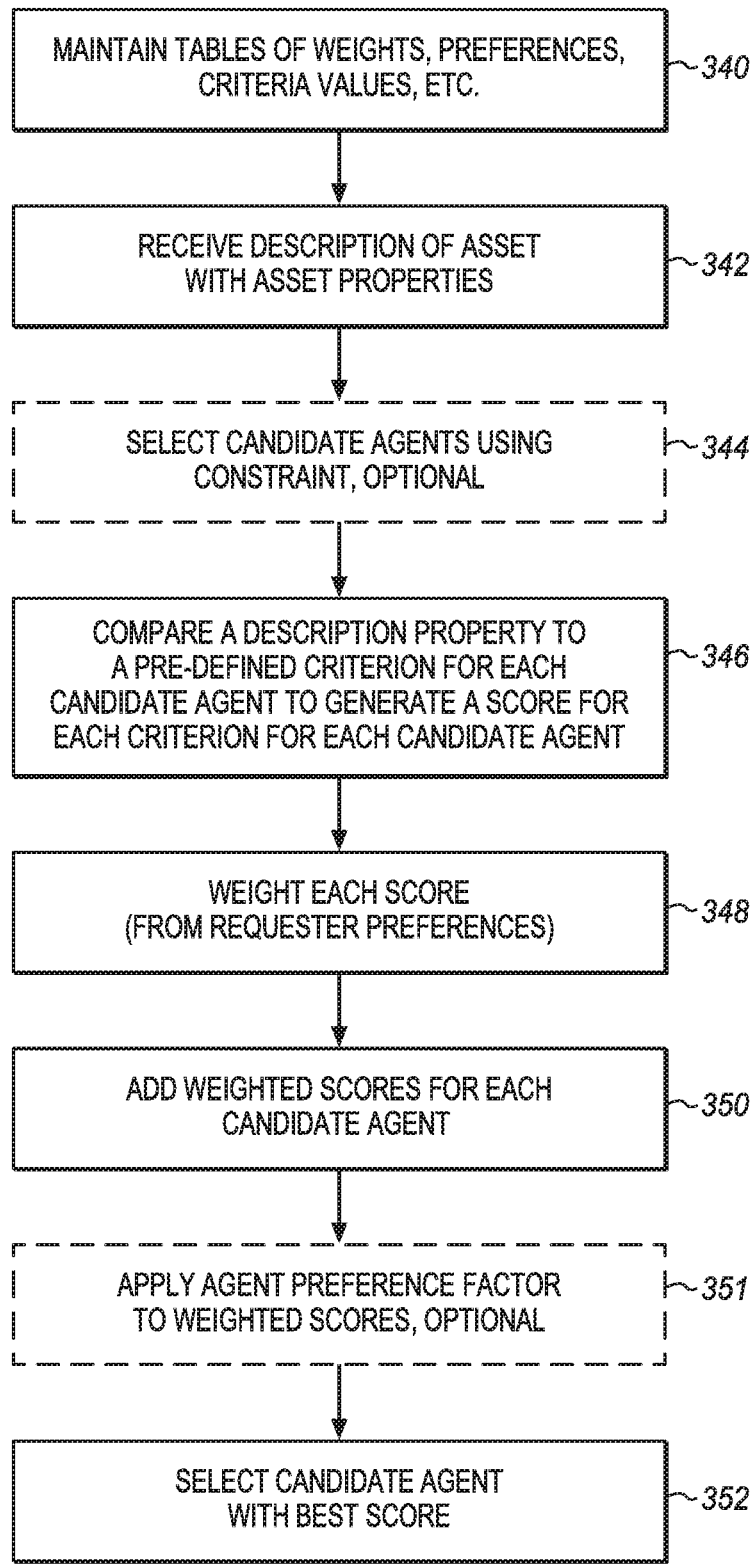
FIG. 5 is a process flow diagram of selecting an agent or auction house in FIGS. 3 and 4 according to embodiments.
Figure 8:
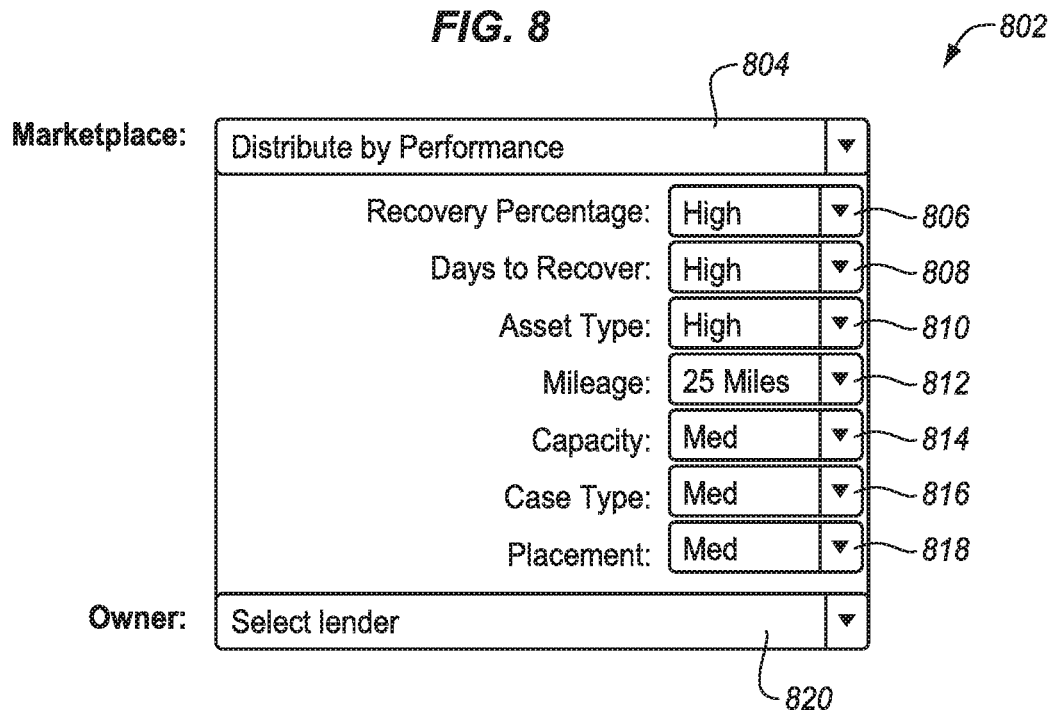
FIG. 8 is a diagram of a remote graphical user interface for requester selections according to embodiments.

FIG. 5 is a process flow diagram of selecting an agent or auction house of any type as described above. This process may be used as an expansion of operations 304 and 324 above. The system performs maintenance of multiple tables at 340. These tables include weights, preferences, criteria values, etc. Before beginning a new agent selection, the system may receive updated preferences, weights, etc. from the requesting agent. An example form for receiving preferences from an operator is shown in FIG. 8.

With the tables maintained, the system is ready at 342 to receive a description of an asset including asset properties. The asset may be an asset in default or a recovered asset for remarketing.

In some embodiments, the system may then select a set of candidate agents at 344 from all of the agents in the system. The candidate agents may come from a list of preferred agents from the requesting agent or it may be a set of agents that are selected by applying a criterion value as a constraint. As an example, the candidates may be those that have a location near the asset. In other words, the asset location may be used as a constraint to limit candidate agents to those within some selected distance from the asset. The selected candidate may also or in addition be a set of agents that perform well with the particular asset based on a make constraint, a placement type constraint, a price constraint, etc. Agents may perform well because they are in a location in which the assets are in demand, or because they have a particular aptitude for a particular type of asset or a particular type of defaulting borrower or lessee.

At 346 the system compares a property in the received description to values for a corresponding pre-defined criterion for each candidate agent. This comparison is used to generate a score for each criterion for each candidate agent. As an example, if a description property for brand includes the value "Buick" and the candidate agent includes the value "Buick" for capable brands, then a score is generated to show that there is a match. This continues until all of the relevant criteria values are scored. The operator may select criteria to include and criteria to exclude.

In some cases the requester will provide preferences in which certain criteria are considered more important than other criteria. For example a particular requester may consider price to be more important than the number of days to recover. As a result at 348 the score for price will be weighted for example by multiplying the score for that criterion by a factor greater than 1. The values for each criterion are normalized so that at 350 the scores for each criterion may be added together to obtain a score for each agent. At 352 the total for each agent may be compared to select the agent among the candidate agents that has the best score.

In some cases, the requester may also provide preference factors for particular agents. These preference factors may be used at 351 to weight the scores before a particular agent is selected. As an example, the requesting agent may prefer to work with a particular agent that provides better service. The system will increase the score for that agent but not simply select that agent. If the preferred agent, for example, is too busy, then another agent that is less busy may have a higher score even after the preference factor is applied. In that case, the less busy agent is selected.

Figure 6:
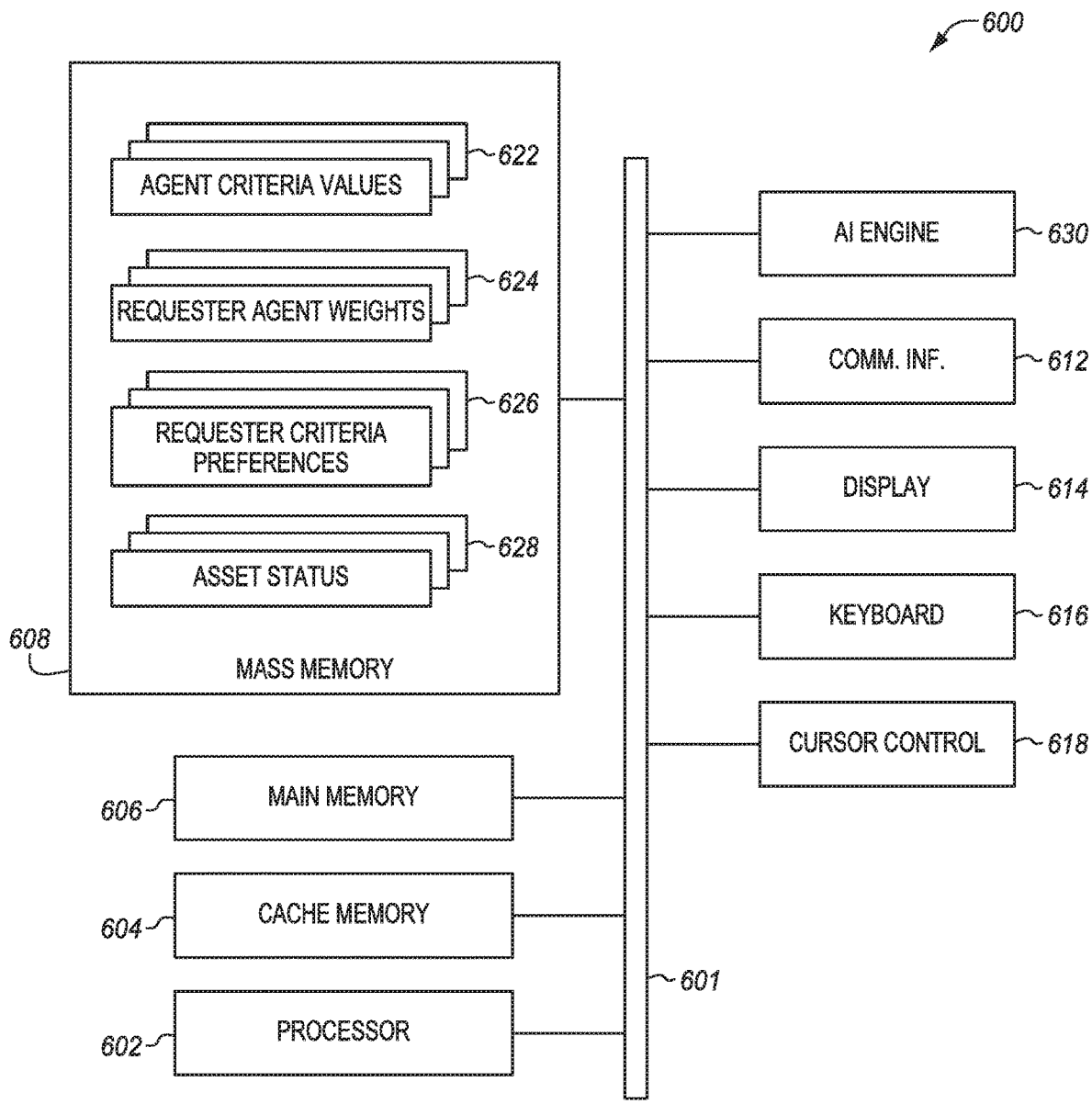
FIG. 6 is a block diagram of a computer system upon which embodiments may be implemented.

FIG. 6 is a block diagram of a computer system 600 representing an example of a system upon which features of the described embodiments may be implemented, such as the system 100 of FIG. 1. The computer system includes a bus or other communication means 601 for communicating information, and a processing means such as one or more microprocessors 602 coupled with the bus for processing information. The computer system further includes a cache memory 604, such as a random access memory (RAM) or other dynamic data storage device, coupled to the bus for storing information and instructions to be executed by the processor. The main memory also may be used for storing temporary variables or other intermediate information during execution of instructions by the processor. The computer system may also include a main nonvolatile memory 606, such as a read only memory (ROM) or other static data storage device coupled to the bus for storing static information and instructions for the processor.

A mass memory 608 such as a solid state disk, magnetic disk, disk array, or optical disc and its corresponding drive may also be coupled to the bus of the computer system for storing information and instructions. The computer system can also be coupled via the bus to a display device or monitor 614 for displaying information to a user. For example, graphical and textual indications of installation status, operations status and other information may be presented to the user on the display device. Typically, an alphanumeric input device 616, such as a keyboard with alphanumeric, function and other keys, may be coupled to the bus for communicating information and command selections to the processor. A cursor control input device 618, such as a mouse, a trackball, trackpad, or cursor direction keys can be coupled to the bus for communicating direction information and command selections to the processor and to control cursor movement on the display.

A communication device 612 is also coupled to the bus. The communication device may include a wired or wireless modem, a network interface card, or other well-known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via one or more conventional network infrastructures, including an Intranet or the Internet, for example.

The mass memory may be used to store several different tables as discussed above. An agent criteria values table 622 contains values for each criterion for each agent. There may be different tables for different types of agents, such as recovery agents, forwarding agents, remarketing agents, etc. or a single table for all data. In some cases, some of the values are a default value or are blank. A requester weights table 624 contains weights for each agent from each requester. There may be different tables for different types of agents. If a requester does not provide weights or does not provide weights for each agent, then some of the weights may be a default, blank, or neutral, e.g. a factor of 1. A requester criteria preferences table 626 contains a preference factor for each criterion for each requester. There may be different tables for different sets of criteria. Again a requester may not provide any or all preference factors so that the table may contain neutral or blank values. In addition an asset description and status table 628 may be used to track information about each asset.

The described tables may be stored as two-dimensional tables, as text files with metadata, or in any other desired way. The data from the asset status table 628 is applied against the other tables by the processor in response to commands from the user interface 614, 616, 618 as described. The system may also be operated or accessed remotely through the communications interface.

The system of FIG. 6 further includes an AI (Artificial Intelligence) engine. This may be implemented in dedicated hardware using parallel processing or in the processor 602 or using some combination of resources. The AI engine may also be external to the server system 600 and connected through a network node or some other means. The AI engine may be configured to use historical data accumulated by the server system to build a model that includes weights and criteria to apply to the selection processes. The model may be repeatedly rebuilt using the accumulated data to refine and increase accuracy.

The AI engine has access to the asset status and other tables 622, 624, 626, 628 and compares results to find patterns in prior asset recoveries. These patterns are then stored in the AI engine for application to new assets. Upon entering a new asset into the asset table, the operator may then operate the AI system to select a recovery agent, remarketing agent, or auction house that is most likely to achieve a desired result. The operator can request that the AI system select the agent that will provide the best price, highest ratings, fastest delivery or any other particular result for the particular asset. The AI engine also adjusts the criteria and the weights that are used. When some criteria are found to be ineffectual then they are removed from the agent criteria values table. When other criteria are found to be helpful, then they are added.

Figure 7:
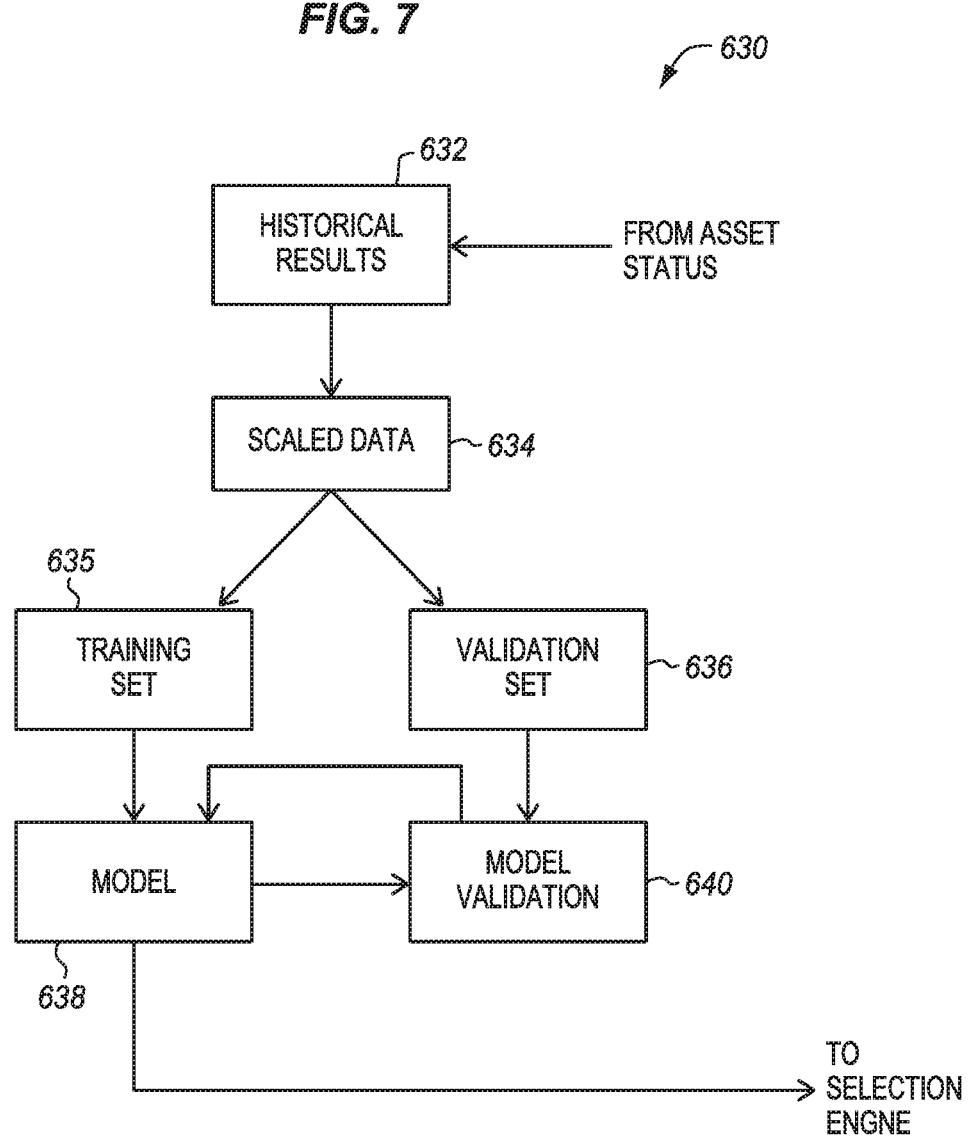
FIG. 7 is a diagram of an AI engine suitable for use with embodiments.

FIG. 7 is a diagram of an AI engine 630 suitable for use with the present selection server system. In the illustrated example historical results 632 are collected from the asset status tables 628. Any additional data may be included so that more data is included in the dataset. The choice of data to include may be modified to suit the particular results and the type of data available. The historical results may be first scaled or normalized to become scaled data 634. This data is then parsed or separated into a training set 635 and a validation set 636. There is variety of different ways to parse historical data and the approach may be adjusted until suitable results are obtained.

The training set is applied to develop a selection model 638. On the other hand the validation set is used to validate and adjust the model. After the model is developed on the training set 635, the model is applied to the validation data 636. The results are compared to the desired results in a model validation operation 640 and the model is adjusted accordingly. This model may then be sent to the server system or used by the server system as a part of the selection engine that is executed by the processor 602. The selection model 638 may be stored in the mass memory 608 or as instructions in some other part of the system. The AI engine 630 may be connected to the asset status tables so that the selection model is improved periodically as more data is obtained.

A lesser or more equipped computer system than the example described above may be preferred for certain implementations. Therefore, the configuration of the exemplary computer system will vary from implementation to implementation depending upon numerous factors, such as price constraints, performance requirements, technological improvements, or other circumstances. The computer system may be duplicated in different locations for distributed computing. As an example, the system may use a simple pre-programmed deterministic selection model instead of an AI model and the AI engine.

FIG. 8 is a diagram of a remote graphical user interface 802 that may be provided on a requester's console to allow the requester to make selections. These selections may then be used to populate the requester criteria preferences. In this example, the requester has a drop down pick list 820 at the bottom of the view to identify an owner of the asset, such as a lender. Another drop down pick list 804 is labeled marketplace, and allows the requester to select how the agents are to be ranked. In this example, the agents will be ranked based on performance. Different pick lists may be provided for forwarders, assessors, auction houses, or other agents that are to be selected.

Additional drop down pick lists are provided to allow the requester to rank or constrain various criteria, such as the importance to the selection of recovery percentage 806, days to recover 808, asset type 810, capacity 814, case type 816, and placement 818. In this example, the requester can weight the importance of each factor as high, medium, or low. The requester may also designate a maximum distance 812 from the location of the asset. With these selections, the system stores the selections in the requester agent weights table 624 for use in applying a description of an asset from the requester designated at 820 to the criteria values. The performance ranking is a further stored preference for the requester. The system uses the weights and preferences to present a ranked list of agents distributed by performance. The requester or the system may then select an agent from the list.

Figure 9:
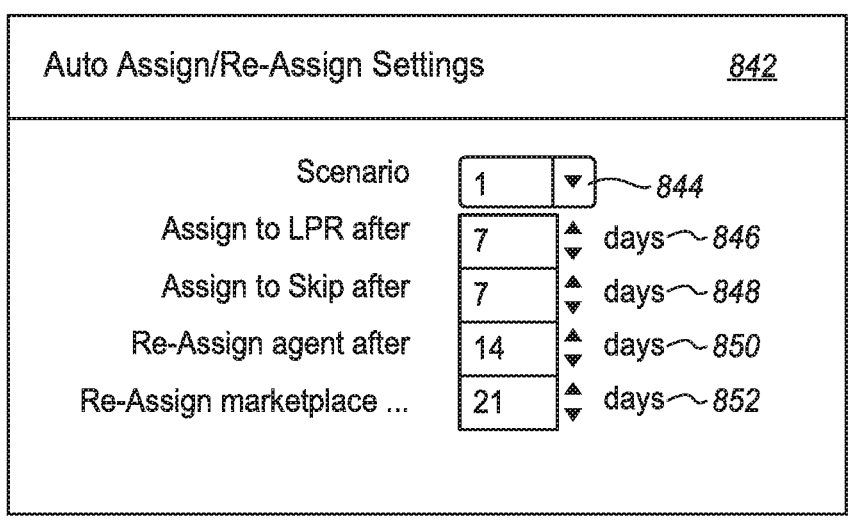
FIG. 9 is a diagram of a remote graphical user interface for requester parameter settings according to embodiments.

FIG. 9 is a diagram of a remote graphical user interface 840 for entering other parameters. The user interface is titled as Auto Assign/Re-Assign Settings 842. In this case, the requester may establish different scenarios that may be applied to different types of assets. The system allows different scenarios to be programmed for ease of reference. The requester may then use a pick list 844 to select a preconfigured scenario or to build a new scenario. In this scenario labeled as 1, the requester can set timers for assigning license plate recognition to find the asset 846, for assigning skiptrace to find the borrower 848, for reassigning the asset to another agent 850, and for reassigning the asset to another marketplace 852. Such an interface allows the requester to establish preferred ways of handling different types of assets. These preferences may also be stored in the system 600.

While drop down pick lists are shown, the requester may be provided with any other desired interface. The requester may begin with a set of default values and then be provided options to modify these preferences based on experience. Alternatively, all of the options may be handled by an operator on behalf of the requester.

While the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the methods described herein may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present description includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The described operations may be provided as a computer program product that may include a machine-readable medium having stored instructions thereon, which may be used to program a computer (or other machine) to perform a process according to the present invention. The machine-readable medium may include, but is not limited to optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to selecting agents for recovery and remarketing, the method and apparatus described herein are equally applicable to other types of agents for other aspects of recovering physical assets. For example, the techniques described herein may be useful in connection with recovery of recreational vehicles, boats, planes and other movable assets used as collateral to secure a loan or lease.

Some embodiments described herein pertain to a method that includes receiving a description at a server system of a physical asset that is to be recovered for lack of payment, the description including a location of the physical asset and a type of the physical asset, applying the description to a pre-defined set of criteria at the server system to select a recovery agent to recover the physical asset, each of a plurality of candidate recovery agents having values assigned to the criteria, the criteria including location of the respective agent, recovery rate of the respective agent, and time to recover by the respective agent, receiving recovery status information at the server system as to whether the asset has been recovered by the selected agent, and updating the recovery rate value of the selected recovery agent using the recovery status information.

Some embodiments described herein pertain to a non-transitory machine-readable medium comprising a plurality of instructions, executed on a computing device, to facilitate the computing device to perform one or more of any of the operations described in the various embodiments herein.

Some embodiments pertain to an apparatus that includes a communications interface of a server system to receive a description of a physical asset that is to be recovered for lack of payment, the description including a location of the physical asset and a type of the physical asset and to receive recovery status information at the server system as to whether the asset has been recovered by a selected agent. The apparatus further includes a memory to store values assigned to criteria for each of a plurality of candidate recovery agents, the criteria including a location of the respective agent, a recovery rate of the respective agent, and a time to recover by the respective agent, and a processing device to facilitate applying the description to a pre-defined set of the stored criteria at the server system to select a recovery agent to recover the physical asset, and to update the recovery rate value of the selected recovery agent using the recovery status information. The apparatus may further include an artificial intelligence engine to add a criterion to the pre-defined set of criteria using patterns in previous recoveries and to perform any of a variety of other functions and operations.

Although this disclosure describes some embodiments in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:

maintaining an assets table of an agent assignment system, the assets table including properties of each of a plurality of recoverable physical assets including a description, a location, and a current status for each of the plurality of assets;

maintaining a recovery agent criteria table of the agent assignment system, the agent criteria table including values for a location and a capacity for each of a plurality of recovery agents for recovery of the recoverable physical asset;

maintaining a requester criteria preferences table of the agent assignment system, the requester criteria preferences table including a preference factor received from each of a plurality of requesters for each of a plurality of agent criteria;

receiving a new asset record from a particular requester, the asset record including properties of a new asset including a description, a location, and a current status of the new asset at the agent assignment system;

receiving a request from the particular requester at the agent assignment system to assign a recovery agent to recover the new asset;

retrieving the recovery agent criteria values from the criteria table in response to the request;

comparing properties of the new asset record to the retrieved agent criteria values to obtain a score for each criterion for each recovery agent;

retrieving the requester criteria preferences for the particular requester from the requester criteria preferences table in response to the request, the requester criteria preferences including a black list of recovery agents which the requester will not accept;

excluding each recovery agent that is on the black list;

weighting each score for each criterion for each recovery agent using the retrieved requester criteria preferences;

adding the weighted scores for each criterion to obtain a total score for each recovery agent;

selecting the recovery agent with a best total score;

assigning the selected recovery agent to recover the new asset;

automatically sending the request from the agent assignment system to the selected recovery agent to recover the new asset; automatically reducing the capacity value of the assigned agent in the agent criteria table at the agent assignment system in response to the assignment;

receiving recovery status information at the agent assignment system as to whether the new asset has been recovered by the assigned recovery agent, the information including a time, and storing the recovery status information as current asset status for the new asset in the assets table;

automatically increasing the capacity value of the assigned agent in the agent criteria table at the agent assignment system in response to the received recovery status information when the new asset has been recovered;

determining if the recovery agent has exceeded a timer for recovering the new asset;

selecting a second recovery agent with the best total score when the timer is exceeded;

receiving a recovery description of the physical asset after recovery, the description including location of the physical asset upon recovery and condition of the physical asset;

applying the description to a pre-defined set of remarketing criteria to select a market, each of a plurality of markets having values assigned to the remarketing criteria, the remarketing criteria including location of the market and sales performance of the respective market; and applying an artificial intelligence engine to add a criterion to the pre-defined set of remarketing criteria using patterns in previous recoveries wherein the added criterion is repeatedly rebuilt using previous recoveries.

2. The method of claim 1, wherein the recovery agent criteria table includes a value for a recovery number of days, the method further comprising updating the recovery number of days at the agent assignment system in response to receiving the recovery status information.

3. The method of claim 1, further comprising normalizing the score for each criterion before adding the weighted scores.

4. The method of claim 1, further comprising applying a distance constraint stored in the criteria preference table for the particular requester, the distance constraint using the location of the new asset to limit candidate recovery agents to those within the distance constraint.

5. The method of claim 1, wherein at least one requester criteria preference of the particular requester in the criteria preference table is applied first as a constraint to the corresponding recovery agent criterion values for each agent, the method further comprising applying the constraint before comparing properties of the new asset record to the agent criteria values.

6. The method of claim 5, wherein the constraint is a make serviced by the recovery agent, and wherein applying the constraint comprises comparing the make of the asset and the make serviced by each agent and excluding an agent if the make of the new asset and of the agent do not match.

7. The method of claim 5, wherein the constraint is a distance between the new asset and the recovery agent, and wherein applying the constraint comprises comparing the location of the asset and the location of each agent and excluding an agent if the distance between the asset location and the agent location exceeds the constraint.

8. The method of claim 1, further comprising:

maintaining an agent weights table of the agent assignment system, the agent weights table including weights received from each requester for at least a portion of the plurality of recovery agents;

retrieving the agent weights for the particular requester from the agent weights table in response to the request; and weighting the total score for each recovery agent with the corresponding agent weight, wherein selecting the recovery agent with the best total score comprises selecting the recovery agent with a best weighted total score.

9. The method of claim 1, wherein the recovery agent is a forwarding agent that forwards the request to a repossession agent selected by the forwarding agent.

10. The method of claim 1, wherein the recovery agent criteria table includes quality data from debtors regarding recovery agents.

11. The method of claim 1, further comprising comparing the received recovery status information to the timer and when the physical asset is not recovered after expiration of the timer, then repeating comparing properties of the new asset record to the retrieved agent criteria values and selecting a different recovery agent based on the comparing properties.

12. The method of claim 1, further comprising sending an alert from the asset assignment system to a lender for the new asset, a buyer of the new asset, and the particular requester in response to assigning the selected recover agent to recover the new asset.

13. The method of claim 1, wherein the asset properties include a type of loan against the respective asset and wherein the recovery agent criteria table includes values for different types of loans.

14. A non-transitory machine-readable medium comprising a plurality of instructions, executed on a computing device, to facilitate the computing device to perform one or more operations comprising:
- maintaining an assets table of an agent assignment system, the assets table including properties of each of a plurality of recoverable physical assets including a description, a location, and a current status for each of the plurality of assets;
- maintaining a recovery agent criteria table of the agent assignment system, the agent criteria table including values for a location and a capacity for each of a plurality of recovery agents for recovery of the recoverable physical asset;
- maintaining a requester criteria preferences table of the agent assignment system, the requester criteria preferences table including a preference factor received from each of a plurality of requesters for each of a plurality of agent criteria;
- receiving a new asset record from a particular requester, the asset record including properties of a new asset including a description, a location, and a current status of the new asset at the agent assignment system;
- receiving a request from the particular requester at the agent assignment system to assign a recovery agent to recover the new asset;
- retrieving the recovery agent criteria values from the criteria table in response to the request;
- comparing properties of the new asset record to the retrieved agent criteria values to obtain a score for each criterion for each recovery agent;
- retrieving the requester criteria preferences for the particular requester from the requester criteria preferences table in response to the request, the requester criteria preferences including a black list of recovery agents which the requester will not accept;
- excluding each recovery agent that is on the black list;
- weighting each score for each criterion for each recovery agent using the retrieved requester criteria preferences;
- adding the weighted scores for each criterion to obtain a total score for each recovery agent;
- selecting the recovery agent with a best total score;
- assigning the selected recovery agent to recover the new asset;
- automatically sending the request from the agent assignment system to the selected recovery agent to recover the new asset;
- automatically reducing the capacity value of the assigned agent in the agent criteria table at the agent assignment system in response to the assignment;
- receiving recovery status information at the agent assignment system as to whether the new asset has been recovered by the assigned recovery agent, the information including a time, and storing the recovery status information as current asset status for the new asset in the assets table;
- automatically increasing the capacity value of the assigned agent in the agent criteria table at the agent assignment system in response to the received recovery status information when the new asset has been recovered;
- determining if the recovery agent has exceeded a timer for recovering the new asset;
- selecting a second recovery agent with the best total score when the timer is exceeded;
- receiving a recovery description of the physical asset after recovery, the description including location of the physical asset upon recovery and condition of the physical asset;
- applying the description to a pre-defined set of remarketing criteria to select a market, each of a plurality of markets having values assigned to the remarketing criteria, the remarketing criteria including location of the market and sales performance of the respective market; and
- applying an artificial intelligence engine to add a criterion to the pre-defined set of remarketing criteria using patterns in previous recoveries wherein the added criterion is repeatedly rebuilt using previous recoveries.

15. The medium of claim 14, wherein the recovery agent criteria table includes a value for a recovery number of days, the method further comprising updating the recovery number of days at the agent assignment system in response to receiving the recovery status information.

16. The medium of claim 14, the operations further comprising:
- maintaining an agent weights table of the agent assignment system, the agent weights table including weights received from each requester for at least a portion of the plurality of recovery agents;
- retrieving the agent weights for the particular requester from the agent weights table in response to the request; and
- weighting the total score for each recovery agent with the corresponding agent weight,
- wherein selecting the recovery agent with the best total score comprises selecting the recovery agent with a best weighted total score.

17. The medium of claim 14, the operations further comprising sending an alert from the asset assignment system to a lender for the new asset, a buyer of the new asset, and the particular requester in response to assigning the selected recover agent to recover the new asset.

18. An agent assignment system comprising:
- a communications interface to receive a description from a particular requester of a new physical asset that is to be recovered for lack of payment, the description including a location of the physical asset, a location, and a current status of the new asset, to receive a request from a particular requester to assign a recovery agent to recover the new asset, to automatically send a request to a selected recovery agent to recover the new asset, to receive recovery status information as to whether the new asset has been recovered by the assigned recovery agent, the information including a time;
- a memory including an assets table including properties of each of a plurality of recoverable physical assets including a description, a location, and a current status for each of the plurality of assets, a recovery agent criteria table including values for a location and a capacity for each of a plurality of recovery agents for recovery of the recoverable physical asset, and a requester criteria preferences table including a preference factor received from each of a plurality of requesters for each of a plurality of agent criteria and a black list of recovery agents which the requester will not accept;

a processing device to maintain the assets table, the recovery agent criteria table, and the requester criteria preferences table, to retrieve the recovery agent criteria values from the criteria table in response to the request, to compare properties of the new asset record to the retrieved agent criteria values to obtain a score for each criterion for each recovery agent, to retrieve the requester criteria preferences for the particular requester from the requester criteria preferences table in response to the request, to exclude each recovery agent that is on the black list, to weight each score for each criterion for each recovery agent using the retrieved requester criteria preferences, to add the weighted scores for each criterion to obtain a total score for each recovery agent, to select the recovery agent with a best total score, to automatically reduce the capacity value of the assigned agent in the agent criteria table in response to the assignment, to store the recovery status information as current asset status for the new asset in the assets table, and to automatically increase the capacity value of the assigned agent in the agent criteria table at the agent assignment system in response to the received recovery status information when the new asset has been recovered, to determine if the recovery agent has exceeded a timer for recovering the new asset, to select a second recovery agent with the best total score when the timer is exceeded, to receive a recovery description of the physical asset after recovery, the description including location of the physical asset upon recovery and condition of the physical asset and to apply the description to a pre-defined set of remarketing criteria to select a market, each of a plurality of markets having values assigned to the remarketing criteria, the remarketing criteria including location of the market and sales performance of the respective market; and an artificial intelligence engine to add a criterion to the pre-defined set of remarketing criteria using patterns in previous recoveries wherein the added criterion is repeatedly rebuilt using previous recoveries.

19. The apparatus of claim 18, wherein the recovery agent criteria table includes a value for a recovery number of days, and wherein the processor is further to update the recovery number of days in response to receiving the recovery status information.

20. The apparatus of claim 18, wherein the recovery agent criteria table includes quality data from debtors regarding recovery agents.

* * * * *